United States Patent Office 2,695,284
Patented Nov. 23, 1954

2,695,284

PREPARATION OF RESIN ACID NITRILES

Robert G. Brault and Richard A. Reck, Chicago, Ill., assignors to Armour and Company, Chicago, Ill., a corporation of Illinois No Drawing. Application May 19, 1951,
Serial No. 227,268

6 Claims. (Cl. 260—97)

This invention relates to the preparation of resin acid nitriles. The invention is particularly useful in the preparation of nitriles from the abietic acids found in tall oil. The resin acid nitriles prepared in the process involving our invention are extremely useful intermediates for the preparation of many derivatives such as amides, amines, aldehydes and ketones, all of which have a wide variety of applications. The abieto radical of the abietonitriles, in many cases, imparts surface active properties to these derivatives and causes them to be highly useful in the production of detergents, wetting agents, road building materials, etc. The nitriles are useful as plasticizers of synthetic rubber. Previous methods for the preparation of resin acid nitriles have been markedly inefficient with respect to obtaining a relatively pure product in high yield. The main difficulties which attend the practicing of the prior methods include the instability of the abieto radical and the tendency of the resin acids to decarboxylate when heated at high temperatures. Such decarboxylation results in the formation of gaseous and hydrocarbon decomposition products.

The object of the present invention is to provide a process by which resin acids may be treated to recover resin nitriles in a high yield. A further object is to provide a two-step process in which resin acids are held initially at a relatively low temperature for a period of time and then the temperature raised to a high temperature for the completion of the reaction. A still further object is to provide in a process for the preparation of resin acid nitriles the step of preliminarily holding the nitriles within a range of lower temperatures to enable the acids to be converted into ammonium derivatives while also preventing the decarboxylation of the acids and preventing other side reactions. Other specific objects and advantages will appear as the specification proceeds.

In one phase of the invention, we heat a crude mixture of the resin acids to an initial temperature preferably of 120° to 180° C. and pass ammonia gas into the mixture while maintaining the temperature. At the end of the period, and after the bulk of the carboxyl group is converted to amides, the temperature is elevated to 320° C. or above and maintained in the elevated temperature range until the reaction is completed. The product is then separated from the reaction mixture. We prefer to add to the resin acids in the lower temperature holding period catalysts such as red phosphorus and a small amount of boric acid.

We believe that the success of our process depends upon the initial holding of the reaction mixture at a relatively low period for a specific time. The low temperature holding period enables the acids to be converted into ammonium derivatives which are ultimately converted into the nitrile at the higher temperature. The holding period prevents the decarboxylation of the acids and discourages other side reactions which would reduce the yield and impair the purity of the product.

The usual sources of resin acids may be used to furnish the acid component for the reaction. Natural resins such as wood or gum rosin, for example, are suitable. Tall oil, which contains a mixture of abietic acids and fatty acids, is an exceptionally good source. If desired, any of the refined abietic acids, such as pure abietic acid, l-pimaric acid or d-pimaric acid, may be utilized. We prefer to use tall oil as the source because it is inexpensive and the abietic acids found in it are relatively stable and uniform in composition.

We prefer to employ in the lower temperature holding period a range of from 120° to 185° C. Below 125° C., the viscosity of the mixture is too great. The temperature may be raised above 185° C. and we have obtained a high yield of nitriles when the initial heating temperature range is 265° to 270° C. We prefer a temperature substantially below 300° C. for the initial heating step and preferably in the range of 125° to 180° C. In the latter range, we have obtained unusually high yields of a very high quality product.

The temperature range for the second heating step is above 300° C. At atmospheric pressure the temperature is preferably from 320° to 340° C. If solvents are employed to dissolve the acids and to overcome the problem of viscosity, a somewhat lower temperature may be used. The high temperature range will vary due to conditions such as pressure, character of material being treated, etc. In general, it is desired to heat the material to a temperature above 300° C. and to a temperature below the boiling point of the reaction product under the conditions of the process.

The time of the holding period in the lower temperature range will vary considerably. We prefer to maintain the material in the lower temperature range until the bulk of the carboxyl group is converted to amides and the temperature is raised preferably to 300° to 340° C. The usual time required in the holding period is found to be between ½ and 1½ hours. We prefer the longer holding period for best results. No significant improvement seems to occur if the time limit is increased beyond 1½ hours. The period of the final heating at the elevated range is relatively short, requiring only enough time to complete the reaction.

The preparation of the resin acid nitriles is facilitated by the use of a catalyst. We prefer using 1% of red phosphorus (based on the amount of resin acids) and a small amount of boric acid, say .1 gram, which aids in the final removal of phosphorus from the reaction mixture.

Examples may be set out as follows:

*Example 1*

In accordance with the process set out above, 617 grams of a crude mixture of the abietic acids as found in tall oil, 5 grams of red phosphorus and 0.1 gram of boric acid were placed in a one-liter, three-necked flask, fitted with a gas inlet tube, a stirrer, a thermometer, and an air-cooled condenser. The reaction mixture was heated to 140° to 160° C. and ammonia gas was passed into it below the surface of the acids while the mixture was stirred vigorously. The temperature of the mixture was held at 140° to 160° C. for 1½ hours, after which it was rapidly heated to 320° to 340° C. and held at this temperature until the reaction was completed as indicated by the fact that no more water is given off. The mixture was cooled to about 150° C. and filtered to remove phosphorus. The product was heated under vacuum to decompose the ammonium soaps formed and to remove the ammonia. The yield of the abietonitrile was 95.5% based on abietic acid.

*Example 2*

306 grams of a crude mixture of the abietic acids as found in tall oil, 4 grams of red phosphorus and 0.1 gram of boric acid were placed in a one-liter, three-necked flask fitted with a gas inlet tube, an efficient stirrer, a thermometer and an air-cooled condenser. The reaction mixture was heated to 125° to 140° C., and ammonia gas was passed into it below the surface of the acids while the mixture was stirred vigorously. The temperature of the mixture was held at 125° to 140° C. for one hour and then rapidly raised to 325° C. and held at this temperature until the reaction was completed. The mixture was then cooled to about 150° C. and filtered to remove the phosphorus. The product was heated under vacuum to decompose the ammonium soaps formed and to remove the ammonia. The yield of the abietonitrile was 96% based on abietic acid.

*Example 3*

The above experiment was repeated using 312 grams of abietic acids as found in tall oil, 4 grams of red phosphorus and 0.1 gram of boric acid. However, in the initial heating, the temperature was maintained at 125° to 140° C. for only ½ hour and then the temperature was elevated to 325° C. and the abietonitrile separated as above. The yield was 92%.

*Example 4*

The above experiment was repeated with the exception that 634 grams of the abietic acids as found in tall oil, 6 grams of red phosphorus and 0.1 gram of boric acid were used and the temperature was immediately raised to 325° to 340° C. without the initial low-temperature holding period. The yield of abietonitrile was 75%.

*Example 5*

The above experiment was repeated using 150 grams of abietic acids from tall oils, 1 gram of red phosphorus and 0.1 gram boric acid. However, in the initial heating the temperature was held at 140° to 150° C. for 15 minutes and then elevated to 325° C. and the abietonitrile separated as above. The yield was 90%.

*Example 6*

The above experiment was repeated using 150 grams of abietic acids from tall oil, 2 grams of red phosphorus and 0.1 gram boric acid. However, in the initial heating the temperature was maintained at 260° C. for 1½ hours and then the temperature was elevated to 325° C. and the abietonitrile was separated as above. The yield was 98%.

*Example 7*

The above experiment was repeated with the exception that 200 milliliters of toluene were added to 100 grams abietic acid, 1 gram red phosphorus and 0.1 gram boric acid. The temperature was held at 100° C. for two hours, the solvent removed, and the temperature elevated to 325° C. and the abietonitrile separated as above. The yield was 65%.

*Example 8*

The above experiment was repeated using 150 grams of resin acids from tall oil, 2 grams of red phosphorus and 0.1 gram boric acid. However, in the initial heating the temperature was maintained at 265° to 270° C. for 1½ hours and then the temperature was elevated to 325° C. and the nitrile was separated as above. The yield was 90%.

In the foregoing, the expression "abietic acids from tall oil" is intended to include rosin or resin acids other than abietic. A typical analysis of vacuum distilled tall oil may be set out as follows:

25% dextropimaric acid, 50% abietic acid, and 25% pyroabietic acid, the latter probably consisting of dihydroabietic acid, dehydroabietic acid and tetrahydroabietic acid. The exact analysis will, of course, vary with the source of tall oil and may include other specific rosin acids such as neoabietic and levopimaric.

In the above examples, the initial heating periods were effective in converting the bulk of the carboxyl group to amide, thus avoiding side reactions, and particularly the decarboxylation of the acids. The process is carried on as a continuous process and also may be carried on in batch operations.

While in the foregoing specification we have set out specific details in the process for illustrating embodiments thereof, it will be understood that such details may be varied by those skilled in the art without departing from the spirit of our invention.

We claim:

1. A process for preparing mononitriles from rosin acids, characterized by the steps of heating a reaction mixture containing a liquid rosin acid in the presence of ammonia and a phosphorus catalyst at a temperature ranging from 120 to 270° C. to form a rosin amide therein, and thereafter heating the rosin amide-containing reaction mixture at a temperature ranging from 300 to 340° C. to complete the reaction.

2. A process for preparing abietonitrile from abietic acid, characterized by the steps of heating a reaction mixture containing liquid abietic acid in the presence of ammonia gas and a phosphorus catalyst at a temperature ranging from 120 to 270° C. to form the amide derivative of abietic acid therein, and thereafter heating the amide-containing reaction mixture at a temperature ranging from 300 to 340° C. to complete the reaction.

3. A process for preparing abietonitrile from abietic acid, characterized by the steps of heating a reaction mixture containing liquid abietic acid in the presence of ammonia gas and a red phosphorus catalyst at a temperature ranging from 120 to 185° C. to form the amide derivative of abietic acid therein, and thereafter heating the amide-containing reaction mixture at a temperature ranging from 300 to 340° C. to complete the reaction.

4. A process for preparing abietonitrile from abietic acid, characterized by the steps of heating a reaction mixture containing liquid abietic acid in the presence of ammonia gas and a red phosphorus-boric acid catalyst at a temperature ranging from 120 to 185° C. to form the amide derivative of abietic acid therein, and thereafter heating the amide-containing reaction mixture at a temperature ranging from 320 to 340° C. to complete the reaction.

5. A process for preparing mononitriles from rosin acids, characterized by the steps of heating a reaction mixture containing a liquid rosin acid in the presence of ammonia gas and a red phosphorus catalyst at a temperature ranging from 120 to 185° C. to form a rosin amide therein, and thereafter heating the rosin amide-containing reaction mixture at a temperature ranging from 300 to 340° C. to complete the reaction.

6. A process for preparing mononitriles from tall oil rosin acids, characterized by the steps of heating tall oil rosin acids in the presence of ammonia and a red phosphorus-boric acid catalyst at a temperature ranging from 120 to 270° C. to convert said rosin acids to rosin amides, and thereafter heating the rosin amides at a temperature ranging from 300 to 340° C.

References Cited in the file of this patent

UNITED STATES PATENTS

| Number | Name | Date |
|---|---|---|
| 2,375,005 | Kung | May 1, 1945 |
| 2,511,603 | Spurlin | June 13, 1950 |
| 2,526,044 | Ralston | Oct. 17, 1950 |